UNITED STATES PATENT OFFICE.

HENRY BERNSTEIN, OF PHILADELPHIA, PENNSYLVANIA.

PROCESS OF MAKING CUPRAMMONIUM SOLUTION.

965,557.      Specification of Letters Patent.      Patented July 26, 1910.

No Drawing. Original application filed April 12, 1910, Serial No. 555,075. Divided and this application filed June 24, 1910. Serial No. 568,641.

*To all whom it may concern:*

Be it known that I, HENRY BERNSTEIN, a citizen of the United States, residing in the city and county of Philadelphia, State of Pennsylvania, have invented a new and useful Process of Making Cuprammonium Solution, of which the following is a specification.

My invention relates to a new and useful process for making cuprammonium solution, at the ordinary temperature, which is employed in the manufacture of artificial silk and it consists in adding viscous saccharine solution such as molasses, to aqua ammonia solution and bringing the same into contact with metallic copper.

This application is filed as a division of my application Serial No. 555,075, filed April 12, 1910.

It further consists in subjecting molasses to aqua ammonia or ammonia gas, adding this to another solution of aqua ammonia and bringing the same into contact with metallic copper.

It is known that cuprammonium solution can be manufactured or made, by subjecting metallic copper to an ammonia solution and forcing air through this liquid, but by this method it has only been possible to obtain about two and one-half (2½) per cent. of copper in solution and to retain it in the liquid. Improvements in the results obtained by this process have been made, by keeping the temperature down to a low degree, say below 5° C. When the temperature goes above the 5° C. copper hydroxid is precipitated, which reduces the copper strength and weakens the dissolving power of the solution for cellulose and in some cases destroys the dissolving power. In addition, the solution is not stable and it must be kept in a cool temperature. One of the principal objections to this is the large expense in maintaining the low temperature, and in addition it is unhealthy and disagreeable for the workmen.

By my process I am enabled to prepare cuprammonium solution stronger than heretofore, since it is well known that, under ordinary temperatures, a 2% solution only can be obtained, but by my process I obtain a solution of five per cent. (5%), or above, of copper, also stable at the ordinary temperature and having a strong dissolving power.

In carrying out my invention I prefer to take a solution of aqua ammonia and add about two per cent. (2%) of molasses thereto. This molasses solution is then added to aqua ammonia, of suitable strength, and this last solution is brought into contact with the metallic copper in any form, such as strips or shavings in a suitable vessel and air is then forced through the liquid. While any suitable solution may be employed, I preferably take a strong aqua ammonia solution of about twenty per cent. (20%) strength and dissolve the molasses substance therein to form a molasses solution. This molasses solution is added to an aqua ammonia solution, of fourteen to twenty per cent. of ammonia gas, and this solution is then placed or brought into contact with copper strips or shavings in a suitable receptacle and I then force air or any suitable gas containing free oxygen through the liquid. By this, in from six to eight hours, I obtain a solution of five per cent. (5%) or over and I am enabled to dissolve at ordinary temperatures about eight per cent. (8%) of cellulose solution of great viscosity. I employ molasses by reason of its three component elements: first, sucrose, kept from crystallizing because of the materials with it; second, invert sugar; and third, potash salts. By this method a high percentage of cellulose can be dissolved and kept stable at ordinary temperature.

Having thus described my invention, what I claim as new and desire to secure by Letters Patent, is:—

1. The process of making cuprammonium solution, which consists in subjecting metallic copper to a mixture or solution of aqua ammonia and molasses, and passing a current of a suitable gas containing free oxygen through the liquid.

2. The process of making cuprammonium solution, which consists in dissolving molasses in aqua ammonia to form a molasses solution, adding the molasses solution to aqua ammonia of suitable strength, placing this solution into contact with copper in any form such as strips or scraps, and then forcing air through the liquid.

HENRY BERNSTEIN.

Witnesses:
WM. CANER WIEDERSEIM,
C. D. McVAY.